Patented May 12, 1925.

1,537,286

UNITED STATES PATENT OFFICE.

OSCAR L. BARNEBEY, OF DETROIT, MICHIGAN.

PROCESS FOR THE MANUFACTURE OF DECOLORIZING CARBONS.

No Drawing.    Application filed March 23, 1921. Serial No. 454,971.

*To all whom it may concern:*

Be it known that I, OSCAR L. BARNEBEY, a citizen of the United States, residing in Detroit, county of Wayne, and State of Michigan, have invented certain new and useful Improvements in a Process for the Manufacture of Decolorizing Carbons, of which the following is a specification.

The invention relates to a process of treating vegetable materials, especially plants now regarded as waste materials of practically no value, with the object of securing valuable products including good gas adsorbent and decolorizing carbon, silica, potassium salts, phosphates and such other ingredients as the particular plants contain. In my co-pending applications, Serial Nos. 454,972 and 454,973, I set forth the recovery of such products by methods different from the one constituting this invention.

This invention is particularly applicable to plants, and still more particularly to the stalks and straw and leaves of plants, such as oats, rice, corn and similar field crops, which possess a relatively high silica content, although it can be applied with success to plants of lower content of silica as well.

In its preferred form, my process includes, first, charring the vegetable matter to remove all or practically all of the hydrocarbons. Then the carbonized material is treated with concentrated fluo-silicic acid ($H_2SiF_6$), usually in the presence of a strong mineral acid such as hydrochloric acid or sulfuric acid. The mass is then heated, volatilizing the silicon as silicon tetrafluoride, thus removing the same from the carbon. During this heating period, the basic constituents such as magnesia, iron oxide, lime, potash, etc., along with phosphates, chlorides, sulfates and similar salts are dissolved in the mineral acid solution. The carbon is then filtered and the soluble salts washed out, after which the carbon is dried. Reheating the dried carbon may be performed in special cases to improve the product, although usually this improvement is not great enough to warrant the second furnace operation. Such reheating may be accomplished at temperatures similar to those used in carbonization, or slightly higher if necessary since at this stage of the process the soluble and fusible salts have been removed.

The carbonization of the vegetable materials is accomplished in such a manner as to avoid fusing the ash constituents into the carbon. Also the temperature is maintained as low as possible to prevent shrinkage of the carbon nucleus itself. The carbonization is conducted in such a manner as to leave substantially no hydrocarbons in the carbon. While the temperature used can be of a relatively wide range, depending essentially upon the length of time the material is heated and upon the method of removal of the products of distillation, it has been found that the temperature range from 400° C. to 700° C. is most satisfactory. The best general practice is to remove the distillation products as rapidly as they are produced. Such products can be burned to furnish heat for retorting and for any other useful purpose, or they can be separated and purified to yield tar, acetic acid or acetate, alcohol and acetone. However, such purification and separation is not inherently a part of this invention, hence is not described.

The volatile silicon tetrafluoride, produced by action of the fluo-silicic acid with the silica or silicates, is passed into an excess of water with which it reacts to produce silicic acid and regenerates fluo-silicic acid as follows:

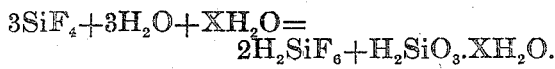

The regenerated $H_2SiF_6$ can be used over and over again in a cyclic manner, thus effecting great economy in the preparation of decolorizing carbon since the fundamental reagent for silica removal is not wasted away in each treatment. The hydrated silicic acid is filtered off, washed and dried and sold as adsorbent silica, or for any other application of purified silica. The fluo-silicic acid solution obtained from the filtered hydrated silicic acid is suitably concentrated by evaporation and when this concentrated solution is added to the next batch of carbonized material, the acid reacts with the silica thus:

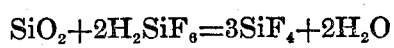

or with silicates, illustrated by calcium silicate ($CaSiO_3$), thus:

In other words, the fluo-silicic acid has a capacity to react with the silica as such or in silicate combination in the ratio of 2-1 molecularly.

Since the silicon tetrafluoride on decomposition precipitates only one-third of its silicon and converts the remaining two-thirds to fluo-silicic acid, it is thus seen that two-thirds of the silicon involved in each cycle of treatment is carried as bound fluorine in order to maintain the proper amount of active hydrofluo-silicic acid available for reaction. The amount of silica removed from any particular carbonized material can be regulated to leave any desired amount of silica in the carbon and likewise the percentage of mineral acid which is added to each batch can be so regulated to leave any desired percentage of basic constituents in the particular carbon.

The following examples will serve to further explain my invention:

Example 1. Rice hulls from a rice mill are carbonized at a temperature of redness (500° to 600° C.) without access of air until carbonization is complete, as shown by cessation of evolution of any appreciable quantities of tar, pyroligneous acid and other gases. The carbonized material consists of approximately 55% mineral matter and 45% carbon, and of this percentage of mineral matter, 85% is silica.

The carbonized material containing the silica is treated with three times its weight of 40% solution of fluosilicic acid. Hydrochloric acid, to the amount of 10% by weight of the carbonized material, is also added.

The solution is heated to boiling, and the silicon-tetrafluoride thereby evolved is passed into water which converts the same into silicic acid and regenerated fluosilicic acid. An excess of water is used to assist in the separation of the silicic acid.

When the reaction is completed, as shown by the fact that no more silicon tetrafluoride is evolved, an excess of water is added to the carbonized material and the carbon filtered and washed. The washed carbon is heated to redness to thoroughly dry the carbon and also to remove the slight traces of hydrochloric acid which remain. The silicic acid, on the other hand, is filtered out, washed and dried.

The solution of fluosilicic acid which has been regenerated is concentrated somewhat by boiling in order to give approximately a 40% solution, in which state it is ready to be used again with the next lot of carbonized rice material. By the use of this process the fluosilicic acid can be used over and over again with only sufficient additions thereto to make up for the fluosilicic acid mechanically lost in carrying out the process.

The product secured is a very excellent decolorizing carbon, and in addition the silicic acid recovered is of commercial value.

Example 2. Bagasse from a cane mill is carbonized at redness (500° to 600° C.) without access of air, after which the carbon is heated to a temperature of 700°-900° C. in the presence of oxygenated gases which are likewise of that temperature.

By oxygenated gases I mean gases of the nature of steam ($H_2O$), carbon dioxide ($CO_2$) and combustion gases (essentially $CO_2$, $H_2O$ and $N_2$). The second stage of carbonizing is continued until 30% to 60% by weight of carbonized material is eliminated by reaction. The resulting carbonized material is treated with twice its weight of 40% fluosilicic acid solution and one-tenth of its weight of sulphuric acid according to the procedure described in Example 1. The fluosilicic acid is used in a cyclic manner, only adding what is necessary to replace fluosilicic acid lost in the operation.

In carrying out Example 2, the heat can be furnished during the first stage of carbonization by burning the distillation products as rapidly as they are produced by admitting to the carbonizing zone a sufficient amount of air to burn the said products without burning up the carbon. Then by regulating the amount of air admitted to the carbonizing zone during the second stage, the 30% to 60% by weight of carbonized material can be removed and the use of oxygenated gases, other than those formed by reaction, can be obviated. Also the two steps can, if desired, be combined into one by gradually heating the material to 700°-900° in the presence of a regulated amount of air, such regulation being accomplished to remove 30 to 60 per cent of the carbonizing material, the reaction being controlled to furnish the heat needed for carbonizing.

Since the various vegetable carbonized materials from different sources are widely different in the relation of basic and silica content, the ratio of the quantity of fluosilicic acid and mineral acid used will vary with the different sources of plant materials.

The only loss of fluo-silicic acid in this process is due to mechanical losses of operation, and in consequence of this fact only sufficient fluo-silicic acid need be added to the operating process to supply such mechanical losses as occur from time to time.

This process is a very economical one, is easy of control and produces carbon of high decolorizing value. The process can be varied quite widely within the scope of the appended claims to meet the specific conditions involved for any particular material, in fact either vegetable or mineral carbonaceous material can be processed as above outlined.

What I claim as my invention is:

1. A process of manufacturing decolorizing carbons comprising charring carbonaceous silicon-containing material, and removing the silica by reaction with fluosilicic acid.

2. A process of manufacturing decolorizing carbons comprising charring carbonaceous silicon-containing material, and removing the silica by reaction with fluosilicic acid and a mineral acid.

3. A process of manufacturing decolorizing carbons comprising charring carbonaceous silicon-containing material, and removing the ash constituents by reaction with fluosilicic acid and hydrochloric acid.

4. A process of manufacturing decolorizing carbons comprising charring carbonaceous silicon-containing material at temperatures from 400° to 700° C., and removing the ash constituents with fluosilicic acid.

5. A process of manufacturing decolorizing carbons comprising charring carbonaceous silicon-containing material at temperatures from 400° to 700° C., and removing the ash constituents by heating with a fluosilicic acid and mineral acid solution.

6. A process of manufacturing decolorizing carbons comprising charring carbonaceous silicon-containing material at temperatures from 400° to 700° C., and removing the ash constituents by heating with fluosilicic acid and hydrochloric acid solutions.

7. A process of manufacturing decolorizing carbons comprising charring carbonaceous silicon-containing material at temperatures from 400° to 700° C., removing ash constituents by heating with fluosilicic acid and a mineral acid solution, filtering and washing the carbon, drying the carbon, and again heating the resultant carbon to a temperature of 400° to 700° C.

8. A process of manufacturing decolorizing carbons comprising charring carbonaceous silicon-containing material, removing the silicon with fluosilicic acid, and removing base constituents as soluble salts of mineral acids.

9. A continuous extraction process of removing silica from carbonized silicon-containing material comprising treating the latter with fluosilicic acid, volatilizing the resulting silicon-tetrafluoride, decomposing said silicon tetrafluoride with water to reproduce fluosilicic acid, and recovering the fluosilicic acid for subsequent use.

10. A continuous extraction process of removing silica from carbonized silicon-containing material comprising treating the latter with fluosilicic acid, volatilizing the resulting silicon tetrafluoride, causing interaction of silicon tetrafluoride with water to regenerate fluosilicic acid, and making cyclic utilization of said fluosilicic acid for the treatment of additional carbonized material.

In testimony whereof, I hereunto affix my signature.

OSCAR L. BARNEBEY.